(12) United States Patent
Nakamura et al.

(10) Patent No.: US 8,264,817 B2
(45) Date of Patent: Sep. 11, 2012

(54) DIELECTRIC CERAMIC AND LAMINATED CERAMIC CAPACITOR

(75) Inventors: Masanori Nakamura, Nagaokakyo (JP); Toshihiro Okamatsu, Nagaokakyo (JP); Akira Kato, Nagaokakyo (JP); Shinya Isota, Nagaokakyo (JP)

(73) Assignee: Murata Manufacturing Co., Ltd., Nagaokakyo-Shi (JP)

( * ) Notice: Subject to any disclaimer, the term of this patent is extended or adjusted under 35 U.S.C. 154(b) by 157 days.

(21) Appl. No.: 12/938,647

(22) Filed: Nov. 3, 2010

(65) Prior Publication Data

US 2011/0122541 A1 May 26, 2011

(30) Foreign Application Priority Data

Nov. 20, 2009 (JP) .................. 2009-264906

(51) Int. Cl.
*H01G 4/06* (2006.01)

(52) U.S. Cl. ............ 361/321.4; 361/311; 361/313; 361/321.5; 361/306.1; 361/306.3; 501/135; 501/136; 501/137; 501/138

(58) Field of Classification Search ............ 361/321.4, 361/303–305, 309, 311–313, 321.1, 321.2, 361/321.5, 306.1, 306.3; 501/134–139; 252/62.2
See application file for complete search history.

(56) References Cited

U.S. PATENT DOCUMENTS

| | | | | |
|---|---|---|---|---|
| 5,077,247 A * | 12/1991 | Sato et al. ............... | 501/137 |
| 6,556,422 B2 | 4/2003 | Kim et al. | |
| 6,960,547 B2 * | 11/2005 | Matoba et al. .......... | 501/139 |
| 7,273,825 B2 | 9/2007 | Muto et al. | |
| 7,397,649 B2 * | 7/2008 | Muto et al. .............. | 361/321.4 |
| 7,796,373 B2 | 9/2010 | Sasabayashi et al. | |
| 8,093,172 B2 * | 1/2012 | Choo et al. ............. | 501/137 |
| 8,107,220 B2 * | 1/2012 | Nakamura et al. ...... | 361/321.2 |
| 8,164,880 B2 * | 4/2012 | Kang et al. ............. | 361/321.4 |
| 2002/0074154 A1 | 6/2002 | Kim et al. | |
| 2007/0142210 A1 | 6/2007 | Muto et al. | |
| 2007/0191211 A1 | 8/2007 | Hosono et al. | |

FOREIGN PATENT DOCUMENTS

| | | |
|---|---|---|
| JP | 2002029836 | 1/2002 |
| JP | 2005194138 A | 7/2005 |
| JP | 2006-282483 A | 10/2006 |
| JP | 2006-287046 A | 10/2006 |
| JP | 2007-197233 A | 8/2007 |
| JP | 2007-217205 A | 8/2007 |
| JP | 2008-254934 A | 10/2008 |
| JP | 2009-249257 A | 10/2009 |
| WO | WO-2006/018928 A1 | 2/2006 |
| WO | WO-2008105240 A1 | 9/2008 |
| WO | WO-2009-041160 A1 | 4/2009 |
| WO | WO-2009-119613 A1 | 10/2009 |

OTHER PUBLICATIONS

JPO Office Action (in JP 2009-264906), mailed Jan. 24, 2012.

* cited by examiner

*Primary Examiner* — Nguyen T Ha
(74) *Attorney, Agent, or Firm* — Dickstein Shapiro LLP

(57) ABSTRACT

A laminated ceramic capacitor which has a dielectric ceramic with a high dielectric constant and has excellent reliability against changes in temperature and mechanical shocks, even when dielectric ceramic layers are reduced in thickness employs a dielectric ceramic containing $(Ba_{1-x}Ca_x)_yTiO_3$ (where $0.045 \leq x \leq 0.15$ and $0.98 \leq y \leq 1.05$) as its main constituent and containing $Re_2O_3$ (where Re is at least one of Gd, Dy, Ho, Yb, and Y), MgO, MnO, $V_2O_5$, and $SiO_2$ as accessory constituents, which is represented by the general formula: $100(Ba_{1-x}Ca_x)_yTiO_3 + aRe_2O_3 + bMgO + cMnO + dV_2O_5 + eSiO_2$, and satisfies each of the following conditions: $0.65 \leq a \leq 1.5$; $0.98 \leq y \leq 1.05$; $0.15 \leq b \leq 2.0$; $0.4 \leq c \leq 1.5$; $0.02 \leq d \leq 0.25$; and $0.2 \leq e \leq 3.0$.

20 Claims, 1 Drawing Sheet

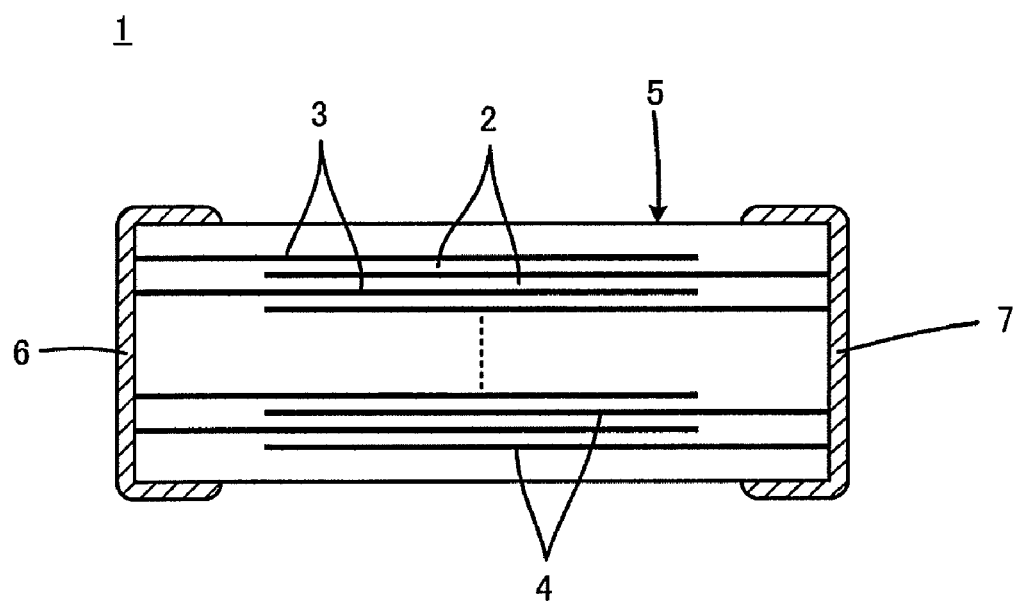

DIELECTRIC CERAMIC AND LAMINATED CERAMIC CAPACITOR

BACKGROUND OF THE INVENTION

1. Field of the Invention

The present invention relates to a dielectric ceramic and a laminated ceramic capacitor, and particularly, relates to a dielectric ceramic which is suitable for reduction in size and increase in capacitance of laminated ceramic capacitors, and a laminated ceramic capacitor configured with the use of the dielectric ceramic.

2. Description of the Related Art

One of effective means for satisfying the needs of reduction in size and increase in capacitance for laminated ceramic capacitors is to reduce the thickness of dielectric ceramic layers provided in the laminated ceramic capacitors. However, the electric field strength applied to the dielectric ceramic layers is increased as the reduction in thickness of dielectric ceramic layers is promoted. Therefore, there is a possibility of a decrease in withstand voltage or deceased reliability against high-temperature and high-field load tests in the laminated ceramic capacitors.

In order to solve the problem described above, it is effective to reduce the size of the ceramic grains constituting the dielectric ceramic layers. However, the reduction in size of the ceramic grains causes another problem as it leads to a decrease in the dielectric constant of the dielectric ceramic.

Under these circumstances, the International publication WO2006/018928 (Patent Document 1) discloses a dielectric ceramic which is capable of obtaining a dielectric constant of 3000 or more while ensuring reliability in the withstand voltage and load test, even when dielectric ceramic layers are reduced in thickness.

Specifically, Patent Document 1 discloses a dielectric ceramic represented by the general formula: $\{100(Ba_{1-x-y}Sr_xCa_y)_m(Ti_{1-z}Zr_z)O_3+aBaO+bR_2O_3+cMgO+dMnO+eCuO+fV_2O_5+gX_uO_v\}$ (provided that R represents at least one selected from La, Ce, Pr, Nd, Sm, Eu, Gd, Tb, Dy, Ho, Er, Tm, Yb, Lu, and Y, and $X_uO_v$ represents a group of oxides containing at least Si), where $0 \leq x \leq 0.05$; $0 \leq y \leq 0.08$; $0 \leq z \leq 0.05$;
0.990≦m; 100.2≦(100m+a)≦102;
0.05≦b≦0.5; 0.05≦c≦2; 0.05≦d≦1.3;
0.1≦e≦1.0; 0.02≦f≦0.15; and 0.2≦g≦2.

One of the features of the dielectric ceramic which has the composition described above is the relatively low R content (b) of 0.05 to 0.5 in terms of $R_2O_3$ with respect to $100(Ba,Sr,Ca)_m(Ti,Zr)O_3$. In addition, an example in Patent Document 1 mentions that it has been confirmed that almost no grain growth caused by firing is observed in the sintered body obtained from the dielectric ceramic which has the composition described above and the ceramic sintered body has almost the same average grain size as the average grain size of the main constituent of the ceramic raw material.

Laminated ceramic capacitors configured with the use of the dielectric ceramic described in Patent Document 1 have low reliability against changes in temperature and mechanical shocks, and thus have a problem that breakages or cracks are likely to occur, thereby leading to a defect in withstand voltage and a decrease in insulation resistance. Therefore, defects may decrease the yield in the case of mounting the laminated ceramic capacitors onto desired substrates. In addition, when the laminated ceramic capacitors are placed in particularly severe environments, for example, as in the case of in-car applications, the laminated ceramic capacitors may fail to adequately cope with such environments.

[Patent Document 1] International publication WO2006/018928

SUMMARY OF THE INVENTION

Therefore, an object of the present invention is to provide a dielectric ceramic which is capable of ensuring high reliability even when there is reduction in thickness of the dielectric ceramic layers, and a laminated ceramic capacitor configured with the use of this dielectric ceramic.

In order to solve the technical problems described above, the dielectric ceramic according to the present invention is characterized by containing $(Ba_{1-x}Ca_x)TiO_3$ (provided that $0.045 \leq x \leq 0.15$ is satisfied) as its main constituent and $Re_2O_3$ (provided that Re is at least one selected from Gd, Dy, Ho, Yb, and Y), MgO, MnO, $V_2O_5$, and $SiO_2$ as accessory constituents, being represented by the general formula: $100(Ba_{1-x}Ca_x)TiO_3+aRe_2O_3+bMgO+cMnO+dV_2O_5+eSiO_2$, and satisfying each of the following conditions:
0.65≦a≦1.5;
0.15≦b≦2.0;
0.4≦c≦1.5;
0.02≦d≦0.25; and
0.2≦e≦3.0.

It is preferred that in the dielectric ceramic according to the invention, the composition ratio e/b of $SiO_2/MgO$ is 0.5 or more and 5.0 or less.

The invention is also directed to a laminated ceramic capacitor containing a capacitor main body comprising a plurality of stacked dielectric ceramic layers and a plurality of internal electrodes formed along specific interfaces between the dielectric ceramic layers, and a plurality of external electrodes formed in different positions from each other on an outer surface of the capacitor main body and electrically connected to specific ones of the internal electrodes.

The laminated ceramic capacitor according to the invention is characterized in that the dielectric ceramic layers comprise the dielectric ceramic according to the invention described above.

The dielectric ceramic according to the present invention is unlikely to cause problems such as cracks and a decrease in insulation resistance caused by changes in temperature and mechanical shocks, and is capable of ensuring high reliability. The reason why this advantageous effect is produced is presumed as follows.

In the dielectric ceramic according to the present invention, the accessory constituents are likely to diffuse into the main constituent grains. On the other hand, the linear expansion coefficient is different between the core section and the shell section in the case of a core-shell structure, and residual stress is thus more likely to be accumulated in the dielectric ceramic. The dielectric ceramic according to the present invention allows, without relying on the core-shell structure, the accessory constituents to diffuse into the main constituent grains to provide a more uniform structure thereby reducing residual stress. Thus, it is first presumed that cracks can be prevented from being caused against changes in temperature.

In addition, Re (rare-earth metal) is present as a solid solution in the $(Ba, Ca)TiO_3$ crystal grains that are the main constituent, thereby reducing the lattice constant for the crystal grains constituting the main constituent and making it less likely to cause atom displacement. Therefore, it is presumed that the mechanical strength of the dielectric ceramic is improved, thereby allowing high reliability to be ensured against a temperature cycling test and a falling weight test.

In addition, the advantageous effect produced by the dielectric ceramic according to the present invention never sacrifices the dielectric constant and the high temperature load life characteristics.

When the composition ratio e/b of $SiO_2/MgO$ is selected to be 0.5 or more and 5.0 or less in the dielectric ceramic according to the present invention, the crack incidence rate in response to applying mechanical shocks can be further reduced. This improvement in mechanical strength is presumed to be derived from a stable structure obtained by appropriate timings of densification and grain growth of the ceramic, and thus elimination of pores in the dielectric ceramic and control of variations in grain size.

BRIEF DESCRIPTION OF THE DRAWINGS

FIG. 1 is a cross-sectional view schematically illustrating a laminated ceramic capacitor 1 configured with the use of a dielectric ceramic according to the present invention.

DETAILED DESCRIPTION OF THE INVENTION

With reference to FIG. 1, a laminated ceramic capacitor 1 to which a dielectric ceramic according to the present invention is applied will be described first.

The laminated ceramic capacitor 1 includes a capacitor main body 5 composed of a plurality of stacked dielectric ceramic layers 2 and a plurality of internal electrodes 3 and 4 formed along the specific interfaces between the dielectric ceramic layers 2. The internal electrodes 3 and 4 contain, for example, Ni as its main constituent.

First and second external electrodes 6 and 7 are formed in different positions from each other on the outer surface of the capacitor main body 5. The external electrodes 6 and 7 contain, for example, Ag or Cu as their main constituent. If necessary, a plating film, not shown, is formed on the external electrodes 6 and 7. The plating film is composed of, for example, a Ni plating film and a Sn plating film formed on the Ni plating film.

In the case of the laminated ceramic capacitor 1 embodiment shown in FIG. 1, the first and second external electrodes 6 and 7 are formed on the respective end surfaces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and the first and second internal electrodes 3 and 4 are alternately arranged with respect to the staking direction.

It is to be noted that the laminated ceramic capacitor 1 may be a two-terminal capacitor including two external electrodes 6 and 7, or may be a multi-terminal capacitor including a large number of external electrodes.

In this laminated ceramic capacitor 1, the dielectric ceramic layers 2 are composed of a dielectric ceramic containing $(Ba_{1-x}Ca_x)TiO_3$ (provided that $0.045 \leq x \leq 0.15$ is satisfied) as its main constituent and containing $Re_2O_3$ (provided that Re is at least one selected from Gd, Dy, Ho, Yb, and Y), MgO, MnO, $V_2O_5$, and $SiO_2$ as accessory constituents.

This dielectric ceramic has a composition represented by the general formula: $100(Ba_{1-x}Ca_x)TiO_3 + aRe_2O_3 + bMgO + cMnO + dV_2O_5 + eSiO_2$. However, in the general formula, the following conditions are each satisfied:

$0.65 \leq a \leq 1.5$;
$0.15 \leq b \leq 2.0$;
$0.4 \leq c \leq 1.5$;
$0.02 \leq d \leq 0.25$; and
$0.2 \leq e \leq 3.0$.

When the dielectric ceramic described above is used to constitute the dielectric ceramic layers 2, the laminated ceramic capacitor 1 can ensure high reliability against changes in temperature and mechanical shocks without sacrificing the dielectric constant or the high temperature load life characteristics, as is clear from experimental examples described later.

The advantageous effect produced by the dielectric ceramic according to the present invention is not derived from a core-shell structure. Since the linear expansion coefficient is different between a core section and a shell section in the case of a core-shell structure, residual stress is more likely to be accumulated in the dielectric ceramic. However, the dielectric ceramic according to the present invention allows the accessory constituents to be dispersed in main constituent grains to provide a more uniform structure, thereby allowing residual stress to be reduced. This leads to an improvement in reliability against changes in temperature.

When the composition ratio e/b of $SiO_2/MgO$ is selected to be 0.5 or more and 5.0 or less in the dielectric ceramic according to the present invention, the crack incidence rate in the case of applying mechanical shocks as in the case of a falling weight test, can be further reduced, as is clear from the experimental examples described later.

While the (Ba, Ca)/Ti ratio is preferably on the order of 0.98 to 1.05 in the main constituent $(Ba_{1-x}Ca_x)TiO_3$ of the dielectric ceramic according to the present invention, the (Ba, Ca)/Ti ratio can be appropriately adjusted without damaging the object of the present invention. It is to be noted that while the experimental examples described later show cases of producing samples with the (Ba, Ca)/Ti ratio of 1, it has been confirmed that substantially the same results are obtained even when the ratio is varied within the range of 0.98 to 1.05.

Further, while impurities such as $ZrO_2$ may be mixed into the dielectric ceramic in the process of producing the laminated ceramic capacitor 1, these impurities are generally not intended to substantially affect the characteristics of the laminated ceramic capacitor 1.

For the purpose of producing a raw material for the dielectric ceramic, a $(Ba, Ca)TiO_3$ based main constituent powder is first produced. For example, a solid-phase synthesis method is applied in which compound powders such as oxides, carbonates, chlorides, and organic metal compounds containing constituent elements for the main constituent are mixed at a predetermined ratio and subjected to a heat treatment. It is to be noted that a hydrothermal synthesis method, a hydrolysis method, etc. may be applied instead of the solid-phase synthesis method.

On the other hand, compound powders such as oxides, carbonates, chlorides, and organic metal compounds containing each of Re, Mg, Mn, V, and Si as accessory constituents are prepared. Then, these accessory constituent powders are mixed with the main constituent powder at a predetermined ratio, thereby providing a raw material powder for the dielectric ceramic.

For the purpose of producing the laminated ceramic capacitor 1, the raw material powder for the dielectric ceramic, obtained in the way described above, is used to produce a ceramic slurry, ceramic green sheets are formed from this ceramic slurry, multiple ceramic green sheets are stacked to obtain a raw laminate to serve as the capacitor main body 5, and the step of firing this raw laminate is carried out. In the step of firing the raw laminate, the raw material powder for the dielectric ceramic, blended as described above is fired to obtain the dielectric ceramic layers 2 composed of the sintered dielectric ceramic.

Experimental examples will be described below, which were carried out in accordance with the present invention.

EXPERIMENTAL EXAMPLE 1

For the purpose of producing a main constituent powder, respective powders of $BaCO_3$, $CaCO_3$, and $TiO_2$ were prepared, and each weighed in predetermined amounts, and then, after the addition of pure water and a dispersant, a further grinding and crushing treatment was carried out with the use of a forced-circulation wet grinding mill (using PSZ media). The treated slurry was dried in an oven, and then subjected to a heat treatment at a temperature of 950° C. or more, thereby providing a $(Ba, Ca)TiO_3$ based main constituent powder with an average grain size of 0.15 to 0.25 μm.

Subsequently, for the purpose of producing a dielectric raw material powder, respective powders of $Re_2O_3$, $MgCO_3$, $MnCO_3$, $V_2O_5$, and $SiO_2$ were prepared in addition to the main constituent powder, and each weighed in predetermined amounts, and then, after the addition of pure water and a dispersant, a further grinding and crushing treatment was carried out with the use of a forced-circulation wet grinding mill (using PSZ media). Then, the treated slurry was dried in an oven to obtain a dielectric raw material powder.

The obtained dielectric raw material powder for respective samples has the composition represented by the general formula: $100(Ba_{1-x}Ca_x)TiO_3 + aRe_2O_3 + bMgO + cMnO + dV_2O_5 + eSiO_2$, where the Ca content x, the type of Re and the Re content a, the Mg content b, the Mn content c, the V content d, the Si content e, and the ratio e/b are set as shown in Table 1.

TABLE 1

| Sample Number | Ca Content x | Re Type | Re Content a | Mg Content b | Mn Content c | V Content d | Si Content e | e/b |
|---|---|---|---|---|---|---|---|---|
| 1 | 0.05 | Dy | 0.8 | 1.0 | 0.5 | 0.1 | 2.2 | 2.2 |
| 2 | 0.05 | Gd/Y | 0.2/0.6 | 1.0 | 0.5 | 0.1 | 2.2 | 2.2 |
| 3 | 0.05 | Ho | 0.9 | 1.0 | 0.5 | 0.1 | 2.2 | 2.2 |
| 4 | 0.05 | Gd/Yb | 0.3/0.5 | 1.0 | 0.5 | 0.1 | 2.2 | 2.2 |
| 5 | 0.05 | Y | 1.0 | 1.0 | 0.5 | 0.1 | 2.2 | 2.2 |
| 6 | 0.05 | Dy/Y | 0.6/0.2 | 1.0 | 0.5 | 0.1 | 2.2 | 2.2 |
| 7 | 0.045 | Dy/Y | 0.6/0.2 | 1.0 | 0.4 | 0.15 | 1.8 | 1.8 |
| 8 | 0.06 | Dy/Y | 0.6/0.2 | 1.0 | 0.4 | 0.15 | 1.8 | 1.8 |
| 9 | 0.08 | Dy/Y | 0.6/0.2 | 1.0 | 0.4 | 0.15 | 1.8 | 1.8 |
| 10 | 0.10 | Dy/Y | 0.6/0.2 | 1.0 | 0.4 | 0.15 | 1.8 | 1.8 |
| 11 | 0.12 | Dy/Y | 0.6/0.2 | 1.0 | 0.4 | 0.15 | 1.8 | 1.8 |
| 12 | 0.14 | Dy/Y | 0.6/0.2 | 1.0 | 0.4 | 0.15 | 1.8 | 1.8 |
| 13 | 0.15 | Dy/Y | 0.6/0.2 | 1.0 | 0.4 | 0.15 | 1.8 | 1.8 |
| 14 | 0.06 | Dy | 0.65 | 1.1 | 0.6 | 0.07 | 1.5 | 1.4 |
| 15 | 0.06 | Dy | 0.8 | 1.1 | 0.6 | 0.07 | 1.5 | 1.4 |
| 16 | 0.06 | Dy | 1.2 | 1.1 | 0.6 | 0.07 | 1.5 | 1.4 |
| 17 | 0.06 | Dy | 1.4 | 1.1 | 0.6 | 0.07 | 1.5 | 1.4 |
| 18 | 0.06 | Dy | 1.5 | 1.1 | 0.6 | 0.07 | 1.5 | 1.4 |
| 19 | 0.07 | Ho | 0.8 | 0.15 | 1.0 | 0.04 | 2.0 | 13.3 |
| 20 | 0.07 | Ho | 0.8 | 0.2 | 1.0 | 0.04 | 2.0 | 10.0 |
| 21 | 0.07 | Ho | 0.8 | 0.4 | 1.0 | 0.04 | 2.0 | 5.0 |
| 22 | 0.07 | Ho | 0.8 | 1.3 | 1.0 | 0.04 | 2.0 | 1.5 |
| 23 | 0.07 | Ho | 0.8 | 1.7 | 1.0 | 0.04 | 2.0 | 1.2 |
| 24 | 0.07 | Ho | 0.8 | 2.0 | 1.0 | 0.04 | 2.0 | 1.0 |
| 25 | 0.05 | Gd/Yb | 0.2/0.5 | 0.6 | 0.4 | 0.06 | 1.7 | 2.8 |
| 26 | 0.05 | Gd/Yb | 0.2/0.5 | 0.6 | 0.6 | 0.06 | 1.7 | 2.8 |
| 27 | 0.05 | Gd/Yb | 0.2/0.5 | 0.6 | 0.8 | 0.06 | 1.7 | 2.8 |
| 28 | 0.05 | Gd/Yb | 0.2/0.5 | 0.6 | 1.2 | 0.06 | 1.7 | 2.8 |
| 29 | 0.05 | Gd/Yb | 0.2/0.5 | 0.6 | 1.5 | 0.06 | 1.7 | 2.8 |
| 30 | 0.05 | Dy/Y | 0.6/0.3 | 1.2 | 0.5 | 0.02 | 1.3 | 1.1 |
| 31 | 0.05 | Dy/Y | 0.6/0.3 | 1.2 | 0.5 | 0.08 | 1.3 | 1.1 |
| 32 | 0.05 | Dy/Y | 0.6/0.3 | 1.2 | 0.5 | 0.18 | 1.3 | 1.1 |
| 33 | 0.05 | Dy/Y | 0.6/0.3 | 1.2 | 0.5 | 0.25 | 1.3 | 1.1 |
| 34 | 0.05 | Dy | 0.9 | 0.8 | 0.6 | 0.08 | 0.2 | 0.3 |
| 35 | 0.05 | Dy | 0.9 | 0.8 | 0.6 | 0.08 | 0.4 | 0.5 |
| 36 | 0.05 | Dy | 0.9 | 0.8 | 0.6 | 0.08 | 0.7 | 0.9 |
| 37 | 0.05 | Dy | 0.9 | 0.8 | 0.6 | 0.08 | 1.0 | 1.3 |
| 38 | 0.05 | Dy | 0.9 | 0.8 | 0.6 | 0.08 | 2.4 | 3.0 |
| 39 | 0.05 | Dy | 0.9 | 0.8 | 0.6 | 0.08 | 3.0 | 3.8 |
| 40 | 0.04* | Dy/Y | 0.6/0.2 | 1.0 | 0.4 | 0.15 | 1.8 | 1.8 |
| 41 | 0.16* | Dy/Y | 0.6/0.2 | 1.0 | 0.4 | 0.15 | 1.8 | 1.8 |
| 42 | 0.06 | Dy | 0.2* | 1.1 | 0.6 | 0.07 | 1.5 | 1.4 |
| 43 | 0.06 | Dy | 0.4* | 1.1 | 0.6 | 0.07 | 1.5 | 1.4 |
| 44 | 0.06 | Dy | 0.6* | 1.1 | 0.6 | 0.07 | 1.5 | 1.4 |
| 45 | 0.06 | Dy | 1.6* | 1.1 | 0.6 | 0.07 | 1.5 | 1.4 |
| 46 | 0.07 | Ho | 0.8 | 0.12* | 1.0 | 0.04 | 2.0 | 66.7 |
| 47 | 0.07 | Ho | 0.8 | 2.2* | 1.0 | 0.04 | 2.0 | 0.9 |
| 48 | 0.05 | Gd/Yb | 0.2/0.5 | 0.6 | 0.2* | 0.06 | 1.7 | 2.8 |
| 49 | 0.05 | Gd/Yb | 0.2/0.5 | 0.6 | 0.3* | 0.06 | 1.7 | 2.8 |
| 50 | 0.05 | Gd/Yb | 0.2/0.5 | 0.6 | 1.6* | 0.06 | 1.7 | 2.8 |
| 51 | 0.05 | Dy/Y | 0.6/0.3 | 1.2 | 0.5 | 0.01* | 1.3 | 1.1 |
| 52 | 0.05 | Dy/Y | 0.6/0.3 | 1.2 | 0.5 | 0.30* | 1.3 | 1.1 |
| 53 | 0.05 | Dy | 0.9 | 0.8 | 0.6 | 0.08 | 0.1* | 0.1 |
| 54 | 0.05 | Dy | 0.9 | 0.8 | 0.6 | 0.08 | 3.2* | 4.0 |

Next, a polyvinyl butyral based binder and ethanol as an organic solvent were added to the dielectric raw material powder, and the dielectric raw material with the polyvinyl butyral based binder and ethanol added was subjected to wet mixing in, a ball mill to produce a ceramic slurry.

Then, this ceramic slurry was subjected to sheet forming in accordance with the doctor blade method, thereby providing rectangular ceramic green sheets.

Next, a conductive paste containing Ni was applied by screen printing onto the ceramic green sheets, thereby forming conductive paste films to serve as internal electrodes.

Next, 100 sheets of the ceramic green sheets with the conductive paste films formed were stacked in such a way that the sides to which the conductive paste films were drawn were alternated, thereby providing a raw laminate to serve as a capacitor main body.

Next, the laminate was heated to a temperature of 250° C. in an $N_2$ atmosphere to carry out a binder removal treatment, and then, fired under the conditions of a top temperature of 1150 to 1200° C. and an oxygen partial pressure of $10^{-9}$ to $10^{-10}$ MPa in a reducing atmosphere composed of a $H_2$—$N_2$—$H_2O$ gas, thereby providing a sintered capacitor main body.

A Cu paste containing $B_2O_3$—$Li_2O$—$SiO_2$—$BaO$ based glass frit was then applied onto the both end surfaces of the capacitor main body, and fired at a temperature of 850° C. in an $N_2$ atmosphere to form external electrodes electrically connected to the internal electrodes, and finally, Ni plating and Sn plating were carried out, thereby providing laminated ceramic capacitors for each sample.

The laminated ceramic capacitors thus obtained were 1.2 mm in width, 2.0 mm in length, and 1.1 mm in thickness, and the dielectric ceramic layers sandwiched between the internal electrodes of the capacitor had a thickness of 1.0 μm. In addition, the average grain size for the sintered dielectric ceramic was 0.2 to 0.35 μm.

Next, the laminated ceramic capacitors for each sample were evaluated as follows.

With the use of an automatic bridge measuring instrument, the capacitances of the laminated ceramic capacitors were measured under the conditions of 1 kHz and 0.5 Vrms, and the dielectric constants $\in_r$ of the dielectric ceramics were calculated from these capacitances. The results are shown in the column "Dielectric Constant" of Table 2.

In order to evaluate the laminated ceramic capacitors for the withstand voltage with respect to direct-current voltages, a voltage is applied to the laminated ceramic capacitors at a pressure rising rate of 100 V/sec to measure electric field strengths at which dielectric breakdown was caused. The results are shown in the column "Withstand Voltage" of Table 2.

In order to evaluate the laminated ceramic capacitors for the high temperature load life, 100 samples of the laminated ceramic capacitors mounted on epoxy resin substrates were subjected to a high temperature load test under the conditions of a temperature of 125° C. and a voltage of 25 V (an electric field strength of 25 kV/mm), in which samples with their insulation resistances below 200 kΩ after a lapse of 1000 hours were regarded as defectives to obtain the number of defectives per 100 samples. The results are shown in the column "The Number of Defectives in High Temperature Load Life" of Table 2.

In order to evaluate the laminated ceramic capacitors for reliability against changes in temperature, 100 samples of the laminated ceramic capacitors mounted on epoxy resin substrates were first left at a temperature of 150° C. for 1 hour as a pretreatment, and then left at normal (ambient) temperature for 24 hours. Next, the cycle of (1) cooling down to a temperature of −55° C. at a rate of temperature decrease of 10° C./second and keeping at the temperature at −55° C. for 30 minutes and (2) then heating up to a temperature of 150° C. at a rate of temperature increase of 10° C./second and keeping at the temperature of 150° C. for 30 minutes was repeated 200 times. After that, the samples were evaluated for the appearance and the presence or absence of cracks (or defects) in accordance with an ultrasonic flaw detection method, the samples with cracks observed were regarded as defective to obtain the number of defectives per 100 samples, and the measurement of the withstand voltage was carried out. The results are shown in the respective columns "The Number of Defectives" and "Withstand Voltage" in the "Temperature Cycling Test" of Table 2.

Furthermore, in order to evaluate the laminated ceramic capacitors for reliability against mechanical shocks, 100 samples of the laminated ceramic capacitors mounted on epoxy resin substrates were supported on the substrates at a support pitch of 30 mm, weights of 10 g or 20 g in mass composed of stainless steel balls was fallen from a height of 100 mm onto the laminated ceramic capacitors, the samples were evaluated for the appearance and the presence or absence of cracks (or defects) in accordance with an ultrasonic flaw detection method, the samples with cracks observed were regarded as defective to obtain the number of defectives per 100 samples. The results are shown in the column "The Number of Defectives in Falling Weight Test" of Table 2. It is to be noted that the column "Weight 10 g" shows the "The Number of Defectives in Falling Weight Test" in the case of falling the weight of 10 g, whereas the column "Weight 20 g" shows the "The Number of Defectives in Falling Weight Test" in the case of falling the weight of 20 g.

TABLE 2

| Sample Number | Dielectric Constant | Withstand Voltage [kV/mm] | The Number of Defectives in High Temperature Load Life | Temperature Cycling Test | | The Number of Defectives in Falling Weight Test | |
|---|---|---|---|---|---|---|---|
| | | | | The Number of Defectives | Withstand Voltage | Weight 10 g | Weight 20 g |
| 1 | 3420 | 142 | 0/100 | 0/100 | 143 | 0/100 | 0/100 |
| 2 | 3340 | 149 | 0/100 | 0/100 | 145 | 0/100 | 0/100 |
| 3 | 3280 | 153 | 0/100 | 0/100 | 152 | 0/100 | 0/100 |
| 4 | 3400 | 138 | 0/100 | 0/100 | 140 | 0/100 | 0/100 |
| 5 | 3190 | 157 | 0/100 | 0/100 | 150 | 0/100 | 0/100 |
| 6 | 3350 | 150 | 0/100 | 0/100 | 151 | 0/100 | 0/100 |
| 7 | 3270 | 136 | 0/100 | 0/100 | 135 | 0/100 | 0/100 |
| 8 | 3380 | 143 | 0/100 | 0/100 | 144 | 0/100 | 0/100 |

TABLE 2-continued

| Sample Number | Dielectric Constant | Withstand Voltage [kV/mm] | The Number of Defectives in High Temperature Load Life | Temperature Cycling Test The Number of Defectives | Withstand Voltage | The Number of Defectives in Falling Weight Test Weight 10 g | Weight 20 g |
|---|---|---|---|---|---|---|---|
| 9 | 3250 | 145 | 0/100 | 0/100 | 140 | 0/100 | 0/100 |
| 10 | 3170 | 140 | 0/100 | 0/100 | 136 | 0/100 | 0/100 |
| 11 | 3220 | 153 | 0/100 | 0/100 | 146 | 0/100 | 0/100 |
| 12 | 3170 | 149 | 0/100 | 0/100 | 142 | 0/100 | 0/100 |
| 13 | 3080 | 145 | 0/100 | 0/100 | 135 | 0/100 | 0/100 |
| 14 | 3520 | 155 | 0/100 | 0/100 | 158 | 0/100 | 0/100 |
| 15 | 3430 | 147 | 0/100 | 0/100 | 152 | 0/100 | 0/100 |
| 16 | 3260 | 143 | 0/100 | 0/100 | 140 | 0/100 | 0/100 |
| 17 | 3150 | 136 | 0/100 | 0/100 | 128 | 0/100 | 0/100 |
| 18 | 3030 | 151 | 0/100 | 0/100 | 143 | 0/100 | 0/100 |
| 19 | 3900 | 118 | 0/100 | 0/100 | 87 | 0/100 | 40/100 |
| 20 | 3550 | 126 | 0/100 | 0/100 | 96 | 0/100 | 18/100 |
| 21 | 3430 | 138 | 0/100 | 0/100 | 138 | 0/100 | 0/100 |
| 22 | 3220 | 146 | 0/100 | 0/100 | 143 | 0/100 | 0/100 |
| 23 | 3120 | 157 | 0/100 | 0/100 | 152 | 0/100 | 0/100 |
| 24 | 3050 | 136 | 0/100 | 0/100 | 143 | 0/100 | 0/100 |
| 25 | 3540 | 144 | 0/100 | 0/100 | 147 | 0/100 | 0/100 |
| 26 | 3460 | 151 | 0/100 | 0/100 | 151 | 0/100 | 0/100 |
| 27 | 3250 | 160 | 0/100 | 0/100 | 157 | 0/100 | 0/100 |
| 28 | 3140 | 147 | 0/100 | 0/100 | 134 | 0/100 | 0/100 |
| 29 | 3060 | 140 | 0/100 | 0/100 | 127 | 0/100 | 0/100 |
| 30 | 3230 | 139 | 0/100 | 0/100 | 136 | 0/100 | 0/100 |
| 31 | 3320 | 150 | 0/100 | 0/100 | 149 | 0/100 | 0/100 |
| 32 | 3220 | 156 | 0/100 | 0/100 | 155 | 0/100 | 0/100 |
| 33 | 3200 | 154 | 0/100 | 0/100 | 150 | 0/100 | 0/100 |
| 34 | 3470 | 145 | 0/100 | 0/100 | 149 | 0/100 | 17/100 |
| 35 | 3350 | 147 | 0/100 | 0/100 | 145 | 0/100 | 0/100 |
| 36 | 3290 | 146 | 0/100 | 0/100 | 143 | 0/100 | 0/100 |
| 37 | 3370 | 152 | 0/100 | 0/100 | 155 | 0/100 | 0/100 |
| 38 | 3220 | 150 | 0/100 | 0/100 | 155 | 0/100 | 0/100 |
| 39 | 3260 | 149 | 0/100 | 0/100 | 147 | 0/100 | 0/100 |
| 40 | 3210 | 139 | 42/100 | 23/100 | 98 | 0/100 | 23/100 |
| 41 | 2940 | 152 | 0/100 | 0/100 | 148 | 0/100 | 0/100 |
| 42 | 3630 | 148 | 8/100 | 64/100 | 67 | 12/100 | 41/100 |
| 43 | 3540 | 147 | 0/100 | 32/100 | 72 | 0/100 | 21/100 |
| 44 | 3420 | 152 | 0/100 | 19/100 | 75 | 0/100 | 8/100 |
| 45 | 2850 | 154 | 0/100 | 0/100 | 149 | 0/100 | 0/100 |
| 46 | 4010 | 137 | 22/100 | 100/100 | 39 | 52/100 | 95/100 |
| 47 | 2850 | 143 | 0/100 | 0/100 | 141 | 7/100 | 28/100 |
| 48 | 3520 | 146 | 100/100 | 0/100 | 144 | 0/100 | 0/100 |
| 49 | 3560 | 154 | 75/100 | 0/100 | 154 | 0/100 | 0/100 |
| 50 | 2830 | 132 | 0/100 | 34/100 | 88 | 0/100 | 0/100 |
| 51 | 3260 | 73 | 38/100 | 29/100 | 48 | 0/100 | 23/100 |
| 52 | 3460 | 147 | 100/100 | 47/100 | 96 | 0/100 | 0/100 |
| 53 | 3090 | 143 | 64/100 | 0/100 | 0/100 | 12/100 | 33/100 |
| 54 | 3180 | 147 | 0/100 | 0/100 | 0/100 | 23/100 | 63/100 |

In Tables 1 and 2, samples 40 to 54 are comparative examples outside the scope of the present invention, and in Table 1, a symbol * is assigned to numerical values for these samples 40 to 54.

In addition, the criteria for acceptance were set as follows for each evaluation item shown in Table 2.

For the "Dielectric Constant", a sample with a dielectric constant of 3000 or more was regarded as an acceptable product.

For the "Withstand Voltage", a sample with a withstand voltage of 100 kV/mm or more was regarded as an acceptable product.

For "The Number of Defectives in High Temperature Load Life", a sample with the number of defectives of 0/100 was regarded as an acceptable product.

For "The Number of Defectives" in the "Temperature Cycling Test", a sample with the number of defectives of 0/100 was regarded as an acceptable product.

For "The Number of Defectives in Falling Weight Test", a sample with the number of defectives of 0/100 was regarded as an acceptable product in the case of the "Weight 10 g", and a sample satisfying 0/100 was regarded as a high-level acceptable product in the case of the "Weight 20 g".

With reference to Tables 1 and 2, comparative example samples 40 to 54 will be considered first.

Sample 40 where the Ca content x less than 0.045 exhibited low reliability for the high temperature load life, and also had defectives in the temperature cycling test. It is to be noted that in the falling weight test, no defective was formed in the case of the "Weight 10 g", whereas defectives were formed in the case of the "Weight 20 g".

For sample 41, where the Ca content x is greater than 0.15, the dielectric constant fell below 3000.

For samples 42 to 44, where the Re content a less than 0.65, defectives were formed in the temperature cycling test. In particular, sample 42 with the extremely small Re content exhibited low reliability for the high temperature load life, and defectives in the falling weight test. Further, samples 43 and 44 also had defectives in the falling weight test in the case of the "Weight 20 g".

For sample 45, where the Re content a greater than 1.5, the dielectric constant fell below 3000.

Sample 46 exhibited low reliability for the high temperature load life, and had defectives in both the temperature cycling test and the falling weight test. The Mg content b less than 0.15.

For sample 47, the Mg content b is greater than 2.0, the dielectric constant fell below 3000, and defectives were also present in the falling weight test.

Samples 48 and 49 exhibited low reliability for the high temperature load life. The Mn content c is less than 0.4.

For sample 50, having a Mn content c greater than 1.5, the dielectric constant fell below 3000, and defectives were also present in the temperature cycling test.

Sample 51, which had a V content d less than 0.02, exhibited low reliability for the withstand voltage and the high temperature load life, and also defectives in the temperature cycling test. In addition, defectives were present in the falling weight test in the case of the "Weight 20 g".

Sample 52, having a V content d greater than 0.25, exhibited low reliability for the high temperature load life, and defectives in the temperature cycling test.

Sample 53, containing a Si content e of less than 0.2, exhibited low reliability for the high temperature load life, and also defectives in the falling weight test.

For sample 54, defectives were present in the falling weight test. The Si content e is greater than 3.0.

In contrast, samples 1 to 39 within the scope of the present invention produced favorable results in terms of dielectric constant, withstand voltage, high temperature load life, temperature cycling test, and falling weight test.

It is to be noted that samples 19, 20, and 34 had defectives in the falling weight test in the case of the "Weight 20 g", although these samples fall within the scope of the present invention. This is believed to be because the ratio e/b of the $SiO_2$ content to the MgO content is involved, judging from the fact that ratios e/b for samples 19 and 20 are greater than those for the other samples, whereas the ratio e/b for sample 34 is less than those for the other samples. Accordingly, the following Experimental Example 2 was carried out in order to obtain a preferred range for the ratio e/b.

EXPERIMENTAL EXAMPLE 2

In Experimental Example 2, samples were produced in the same way as in the case of Experimental Example 1, but the ratio e/b of the $SiO_2$ content to the MgO content was varied while the Ca content x, the type of Re and the Re content a, the Mg content b, the Mn content c, the V content d, and the Si content e fell within the scope of the present invention, as shown in Table 3.

TABLE 3

| Sample Number | Ca Content x | Re Type | Re Content a | Mg Content b | Mn Content c | V Content d | Si Content e | e/b |
|---|---|---|---|---|---|---|---|---|
| 61 | 0.05 | Gd/Dy | 0.1/0.7 | 0.5 | 0.5 | 0.05 | 2.5 | 5.0 |
| 62 | 0.05 | Gd/Dy | 0.1/0.7 | 0.5 | 0.5 | 0.05 | 2 | 4.0 |
| 63 | 0.05 | Gd/Dy | 0.1/0.7 | 0.5 | 0.5 | 0.05 | 1.5 | 3.0 |
| 64 | 0.05 | Gd/Dy | 0.1/0.7 | 1.5 | 0.5 | 0.05 | 2 | 1.3 |
| 65 | 0.05 | Gd/Dy | 0.1/0.7 | 1.5 | 0.5 | 0.05 | 1.5 | 1.0 |
| 66 | 0.05 | Gd/Dy | 0.1/0.7 | 1.5 | 0.5 | 0.05 | 0.75 | 0.5 |
| 67 | 0.05 | Gd/Dy | 0.1/0.7 | 0.15 | 0.5 | 0.05 | 3 | 20.0 |
| 68 | 0.05 | Gd/Dy | 0.1/0.7 | 0.17 | 0.5 | 0.05 | 2.5 | 14.7 |
| 69 | 0.05 | Gd/Dy | 0.1/0.7 | 0.2 | 0.5 | 0.05 | 1.6 | 8.0 |
| 70 | 0.05 | Gd/Dy | 0.1/0.7 | 1.5 | 0.5 | 0.05 | 0.5 | 0.3 |
| 71 | 0.05 | Gd/Dy | 0.1/0.7 | 1.5 | 0.5 | 0.05 | 0.02 | 0.01 |

In Table 3, the ratio e/b falls within the range of 0.5 to 5.0 for samples 61 to 66, whereas the ratio e/b falls outside the range of 0.5 to 5.0 for samples 67 to 71.

Next, the laminated ceramic capacitors for each sample were evaluated in the same way as in the case of Experimental Example 1. The results are shown in Table 4.

TABLE 4

| Sample Number | Dielectric Constant | Withstand Voltage [kV/mm] | in High Temperature Load Life | The Number of Defectives | Withstand | The Number of Defectives in Falling Weight Test | |
|---|---|---|---|---|---|---|---|
| | | | | | | Weight 10 g | Weight 20 g |
| 61 | 3360 | 144 | 0/100 | 0/100 | 149 | 0/100 | 0/100 |
| 62 | 3300 | 146 | 0/100 | 0/100 | 142 | 0/100 | 0/100 |
| 63 | 3290 | 143 | 0/100 | 0/100 | 144 | 0/100 | 0/100 |
| 64 | 3410 | 152 | 0/100 | 0/100 | 150 | 0/100 | 0/100 |
| 65 | 3330 | 157 | 0/100 | 0/100 | 147 | 0/100 | 0/100 |
| 66 | 3280 | 155 | 0/100 | 0/100 | 143 | 0/100 | 0/100 |
| 67 | 3950 | 125 | 0/100 | 0/100 | 75 | 0/100 | 75/100 |
| 68 | 3720 | 122 | 0/100 | 0/100 | 76 | 0/100 | 36/100 |
| 69 | 3540 | 132 | 0/100 | 0/100 | 84 | 0/100 | 13/100 |
| 70 | 3220 | 139 | 0/100 | 0/100 | 139 | 0/100 | 16/100 |
| 71 | 3260 | 145 | 0/100 | 0/100 | 142 | 0/100 | 42/100 |

Referring to Tables 3 and 4, defectives were present in the falling weight test in the case of the "Weight 20 g" for samples 67 to 71 with their ratios e/b falling outside the range of 0.5 to 5.0. On the other hand, no defectives were present in the falling weight test in the case of the "Weight 20 g" for samples 61 to 66 with their ratios e/b falling within the range of 0.5 to 5.0. From this result, it is found that the ratio e/b preferably falls within the range of 0.5 to 5.0.

What is claimed is:

1. A dielectric ceramic comprising barium calcium titanate as its main constituent and $Re_2O_3$, where Re is at least one member selected from the group of Gd, Dy, Ho, Yb, and Y), MgO, MnO, $V_2O_5$, and $SiO_2$, as accessory constituents represented by the general formula:

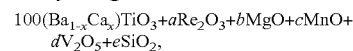

in which 0.045≦x≦0.15;
0.98≦y≦1.05
0.65≦a≦1.5;
0.15≦b≦2.0;
0.4≦c≦1.5;
0.2≦d≦0.25; and
0.2≦e≦3.0.

2. The dielectric ceramic according to claim 1, wherein the composition ratio e/b of $SiO_2$/MgO is 0.5 or more and 5.0 or less.

3. The dielectric ceramic according to claim 2, wherein
0.05≦x≦0.13;
0.7≦a≦1;
0.2≦b≦1.7;
0.5≦c≦1;
0.04≦d≦0.18; and
0.4≦e≦2.4.

4. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 2.

5. The dielectric ceramic according to claim 3, wherein Re is a single member of said group.

6. The dielectric ceramic according to claim 3, wherein Re is a combination of two members of said group.

7. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 3.

8. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 6.

9. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 5.

10. The dielectric ceramic according to claim 1, wherein
0.05≦x≦0.13;
0.7≦a≦1;
0.2≦b≦1.7;
0.5≦c≦1;
0.04≦d≦0.18; and
0.4≦e≦2.4.

11. The dielectric ceramic according to claim 10, wherein Re is a single member of said group.

12. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 11.

13. The dielectric ceramic according to claim 10, wherein Re is a combination of two members of said group.

14. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 13.

15. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 10.

16. The dielectric ceramic according to claim 1, wherein Re is a single member of said group.

17. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 16.

18. The dielectric ceramic according to claim 1, wherein Re is a combination of two members of said group.

19. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 18.

20. A laminated ceramic capacitor comprising:
a capacitor main body comprising a plurality of stacked dielectric ceramic layers and a plurality of internal electrodes disposed along specific interfaces between dielectric ceramic layers; and
a pair of external electrodes disposed at different positions from each other on an outer surface of the capacitor main body and electrically connected to different ones of the internal electrodes;
wherein the dielectric ceramic layers comprise the dielectric ceramic according to claim 1.

* * * * *